O. O. KRUH.
VAPOR ELECTRIC APPARATUS.
APPLICATION FILED MAR. 15, 1909.
1,113,657.
Patented Oct. 13, 1914.
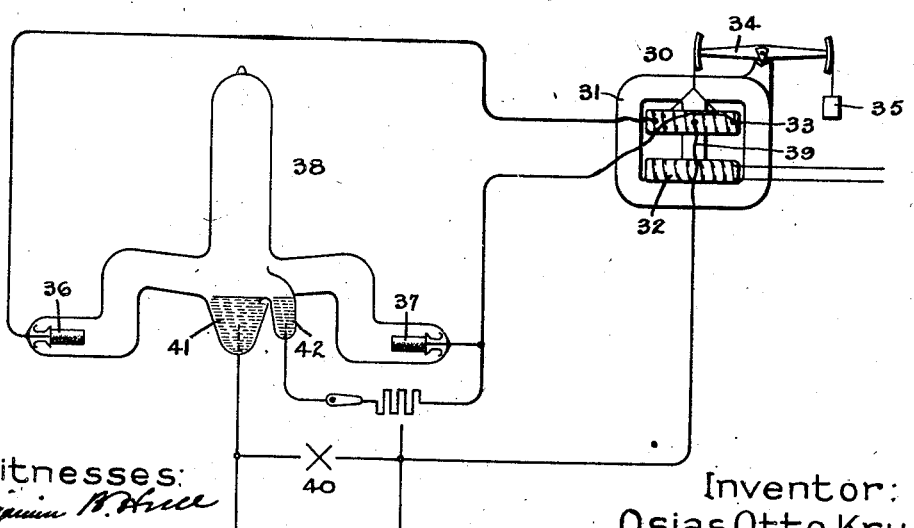
Witnesses:
Inventor:
Osias Otto Kruh,
by Albert G. Davis
Att'y.

UNITED STATES PATENT OFFICE.

OSIAS O. KRUH, OF CZORTKOW, AUSTRIA-HUNGARY, ASSIGNOR TO GENERAL ELECTRIC COMPANY, A CORPORATION OF NEW YORK.

VAPOR ELECTRIC APPARATUS.

1,113,657.   Specification of Letters Patent.   Patented Oct. 13, 1914.

Original application filed April 12, 1905, Serial No. 255,091. Divided and this application filed March 15, 1909. Serial No. 483,522.

*To all whom it may concern:*

Be it known that I, OSIAS O. KRUH, a subject of the Emperor of Austria-Hungary, residing at Czortkow, Austria-Hungary, have invented certain new and useful Improvements in Vapor Electric Apparatus, of which the following is a specification.

This case is a division of my application, Serial No. 255,091, filed April 12, 1905.

My present invention relates to rectifier systems and particularly to those embodying rectifiers of the mercury vapor type.

One embodiment of my invention is represented in the drawings and comprises a system in which a constant current transformer serves the purpose both of regulating the current supplied to the rectifier and of providing the desired overlap of current in the rectifier to keep the latter alive. In this system the current to be rectified is derived from the secondary of a constant current transformer 30 of a well-known type having relatively movable primary and secondary coils. A transformer of this type is conventionally indicated in the drawings and comprises a core 31 having a primary winding 32, a relatively movable secondary winding 33 suspended from a counterbalancing lever 34. A weight 35 only partially counterbalances the weight of this coil so that the coils come together when there is no load but separate under the action of repulsion of the currents in the coils when load is thrown on. The movable coil automatically takes up a position in a manner well understood, such as to preserve a constant current in the secondary circuit.

The terminals of the secondary coil are connected to the anodes 36 and 37 of the rectifier 38. A tap 39 is taken out of the middle point of the secondary 33 and is connected to one end of the consumption circuit 40, the other end of which is connected to the cathode 41 of the rectifier. For the purpose of starting I may use a separate source of current between the starting anode 42 and the cathode 41 or, if desired, the starting anode may be connected to one of the main anodes as indicated, and the apparatus then started in a well understood manner.

It will be understood that in the system indicated, no reactances are employed for the purpose of bridging over the dead point or points where there is a tendency for the current to cease flowing, since I find that in a system fed from a constant current transformer as shown this effect is produced by inductance or some similar action taking place in the transformer itself. Of course inductance coils may be added in series with the direct current to smooth out the same, though this is not necessary if the only purpose to be accomplished is to secure overlapping arcs from the two main anodes to keep the cathode constantly excited and the rectifier in operation.

What I claim as new and desire to secure by Letters Patent of the United States, is:

1. The combination of a vapor rectifier having a plurality of anodes and a cathode, a constant current transformer having relatively movable coils, connections between the anodes and the secondary of said transformer, and a circuit extending between an intermediate point on said secondary and the cathode of said rectifier, the inductance of the transformer producing the desired overlapping of the arcs in the rectifier.

2. The combination of a vapor electric device, having a cathode and a plurality of anodes, a transformer having considerable inductance, connections between the anodes and the secondary of said transformer, and a circuit extending between said cathode and an intermediate point on said secondary, the inductance of the transformer producing the desired overlapping of the arcs in the device.

3. The combination of a mercury arc rectifier, having a mercury cathode and coöperating anodes, a transformer having its primary and secondary coils separated so as to have considerable inductance, connections between the anodes and the secondary of said transformer and a circuit extending between said cathode and a point of intermediate potential on said secondary, the inductance of the transformer maintaining said device continuously conductive.

In witness whereof, I have hereunto set my hand this eighteenth day of February, 1909.

OSIAS O. KRUH.

Witnesses:
HENRY HASPER,
WOLDEMAR HAUPT.